Oct. 13, 1959   E. R. SNYDER   2,908,398
HOSIERY HANGER
Filed May 9, 1955

INVENTOR.
Edward R. Snyder
BY
Thos. S. Donnelly
attorney

United States Patent Office 2,908,398
Patented Oct. 13, 1959

2,908,398
HOSIERY HANGER
Edward R. Snyder, Ypsilanti, Mich.

Application May 9, 1955, Serial No. 506,956

1 Claim. (Cl. 211—113)

This invention relates to a new and useful improvement in a hosiery hanger adapted for hanging hosiery, gloves and similar articles.

It is the object of the present invention to provide a hanger in this class which will be simple in structure, economical of manufacture, durable, compact and highly efficient in use.

Another object of the invention is the provision of a hanger of this type whereby the hosiery or other articles may be quickly and easily mounted on a hanger and removed therefrom.

Another object of the invention is the provision of a hanger of this class which will be attractive and ornamental in appearance and easily and quickly installed on a supporting body.

Other objects will appear hereinafter.

It is recognized that various modifications and changes may be made in the details of the structure illustrated without departing from the invention, and, it is intended that the present disclosure shall be considered to be but the preferred embodiment.

Forming a part of this application are drawings, in which.

Figure 1:
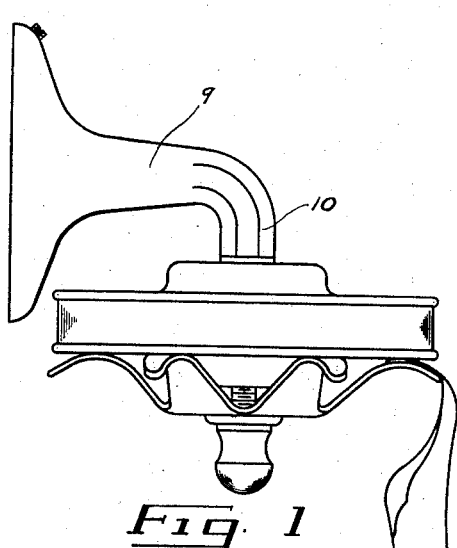
Fig. 1 is a side elevational view of the invention.

As shown in the drawings, I provide a hanger or bracket 9 having a depending portion 10 in which is secured an internally threaded sleeve 12 threaded into which is the upper end of the screw 11 which has the lower threaded portion 11a. This lower threaded screw portion 11a projects downwardly through a disc 13 which is separated from a disc 14 by a band 15, through which it also projects. This lower screw portion 11a also projects through the plate 16 and threaded onto the lower screw portion 11a is a nut or head 17. The disc 16 is provided with a plurality of arms 18 radiating outwardly therefrom and having their terminal portions 19 angularly turned and bearing against the outer face of the member 14. The plate 16 is formed from resilient material. The construction is such that upon threading the head 17 onto the lower threaded portion 11a of the screw 11, the arms 18 of the plate 16 are held in close engagement with the outer surface of disc 14, a sleeve 21 surrounds the screw 11 and a peripheral shoulder 20 on the sleeve 21 bearing against the upper face of the member 12.

This bracket 9 may be mounted on the wall or other suitable supporting body in the bathroom or other suitable location, and a hose 22 after being washed may be slipped between any of the arms 18 and the outer surface of the member 14 and securely held in position for drying.

Figure 4:
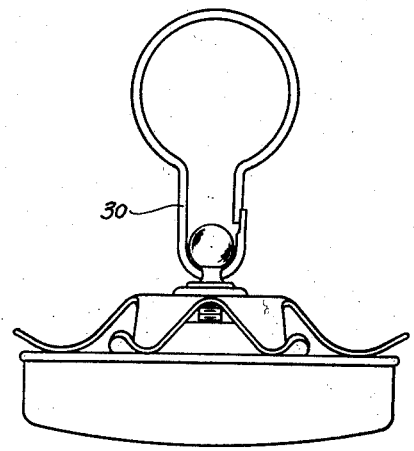
Fig. 4 is a side elevational view of a further form of the invention.
Figure 2:
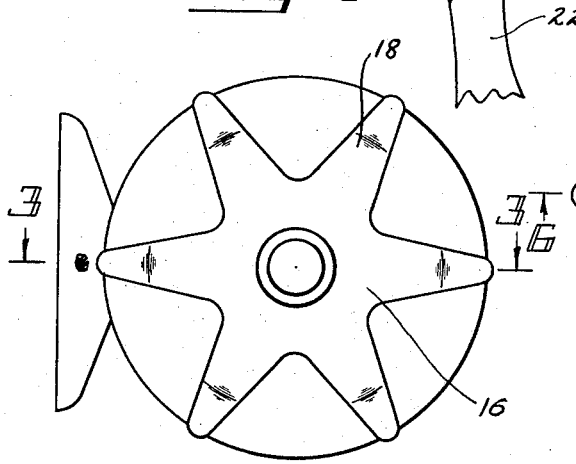
Fig. 2 is a top plan view of the invention.
Figure 5:
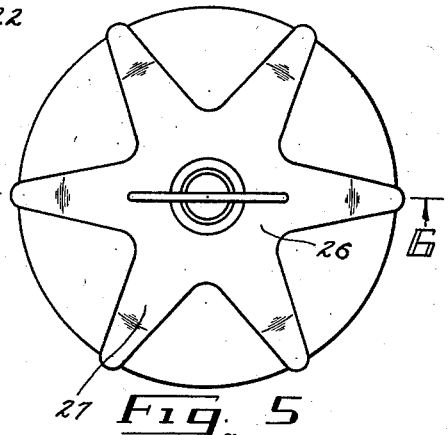
Fig. 5 is a top plan view of the form shown in Fig. 4.
Figure 3:
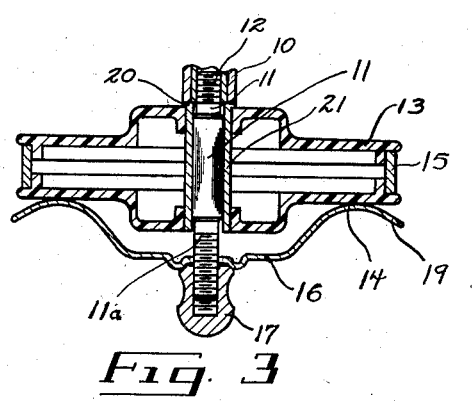
Fig. 3 is a central vertical sectional view of the invention taken on line 3—3 of Fig. 2.
Figure 6:
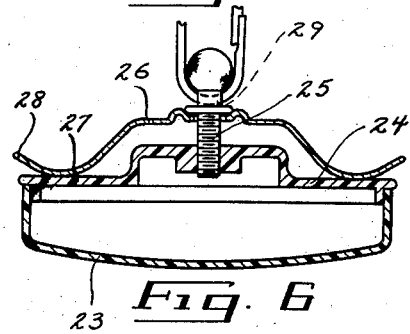
Fig. 6 is a sectional view taken on line 6—6 of Fig. 5.

In Figs. 4, 5 and 6 I have shown a similar construction. In this construction a cup-shaped body or member 23 is provided, the open end of which is enclosed by the plate 24, threaded into which is the screw 25 extending through the plate or disc 26 having the radiating arms 27 with the terminal portions 28 thereof curved outwardly from the face of the plate 24. The screw 25 is provided with a passage 29 forming therethrough through which may be extended a hanger 30 adapted for being mounted on the curtain rod in a bathroom.

The structure may be mounted on the curtain rod and a hose secured under each of the five radiating arms 27.

In this way I have provided a simple and effective means for supporting hosiery or other similar articles at a point convenient where the same are being washed.

What I claim is:

A holding mechanism of the class described, comprising: a circular body having a face; a resilient plate; a plurality of integral arms extending radially outwardly from said plate and engaging the face of said body, said arms projecting out of the plane of said plate to determine a concave structure faced toward said body; threaded means for securing said plate on said body to determine the pressure of said arms against the face of said body; and, a hanger means operatively connected to said threaded means.

References Cited in the file of this patent
UNITED STATES PATENTS

| | | |
|---|---|---|
| 760,922 | Rodman | May 24, 1904 |
| 802,481 | Sendelbach | Oct. 24, 1905 |
| 1,076,121 | Houck | Oct. 21, 1913 |
| 1,143,693 | Down | June 22, 1915 |
| 1,196,087 | Crume | Aug. 29, 1916 |
| 1,557,989 | Dombrowsky | Oct. 25, 1925 |
| 1,693,827 | Stoltenberg | Dec. 4, 1928 |
| 1,744,578 | Rosengarten | Jan. 21, 1930 |
| 1,925,202 | Provost | Sept. 5, 1933 |
| 2,459,417 | Dodge | Jan. 18, 1949 |